No. 678,154. Patented July 9, 1901.
M. ARNDT.
GAS ANALYSIS APPARATUS.
(Application filed Dec. 6, 1899.)
(No Model.)

Witnesses:

Inventor:
Max Arndt

UNITED STATES PATENT OFFICE.

MAX ARNDT, OF AIX-LA-CHAPELLE, GERMANY.

GAS-ANALYSIS APPARATUS.

SPECIFICATION forming part of Letters Patent No. 678,154, dated July 9, 1901.

Application filed December 6, 1899. Serial No. 739,436. (No model.)

*To all whom it may concern:*

Be it known that I, MAX ARNDT, a subject of the King of Prussia, German Emperor, residing at Aix-la-Chapelle, Germany, have invented a new and useful Apparatus for Performing Analyses of Gases by the Absorption of a Gas from a Gaseous Mixture, of which the following is a specification.

My invention relates to apparatus in which gas analyses are performed by the absorption of a gas from a gaseous mixture and the result thereof automatically recorded.

The invention consists in an apparatus in which the parts for effecting the absorption of the gas whose percentage volume in a gaseous mixture is to be ascertained and recorded are moved simultaneously from an actuating-lever, whereby also the gas and air supply tubes of the apparatus are opened and closed as required in the absorption process.

Figure 2:
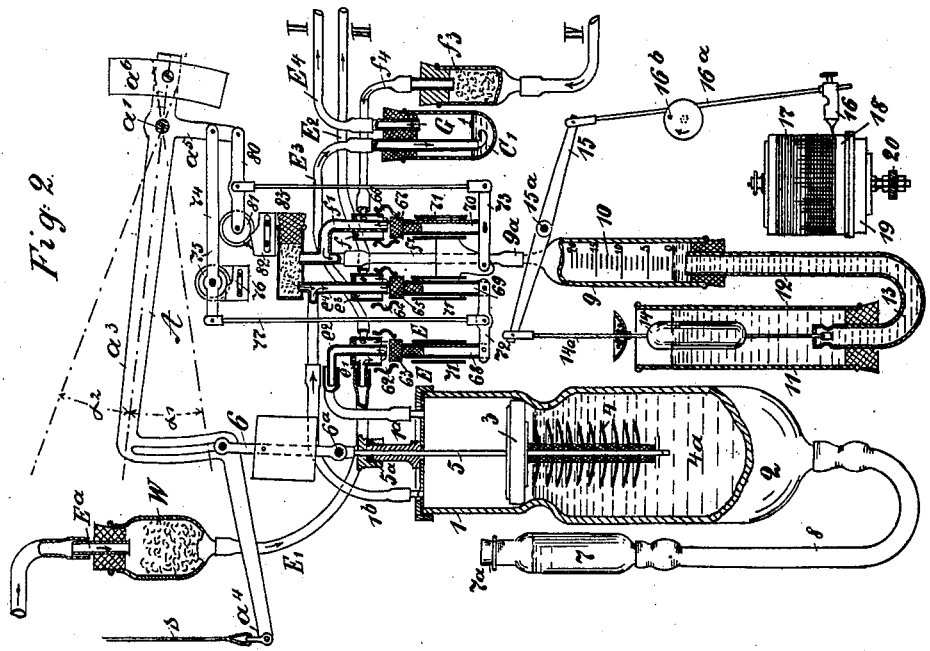
Figure 1:
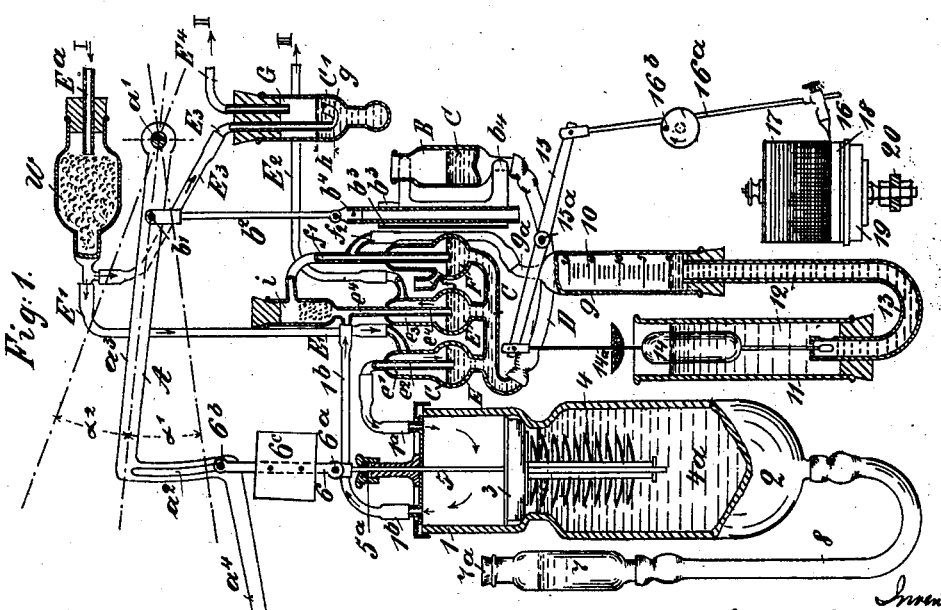

In the accompanying drawings, Figure 1 is a sectional elevation of sufficient of the apparatus to explain the invention, and Fig. 2 is a similar view of a modified construction of the same.

1 is a portion of a vessel serving as a holder or absorption-chamber for the reception of the gaseous mixture to be analyzed, and 2 is another portion of the same vessel, serving as a holder or chamber for the reception of the liquid-absorbing medium $4^a$ and provided with a flexible filling-tube 8, to which is attached a filling vessel 7, having a stopper $7^a$. The holders 1 and 2 can be hermetically shut off from one another by means of a valve 3, fixed on a rod 5, which has also attached to it a body 4, dipping into the absorbing medium $4^a$. Said body is formed of dished plates and serves to carry some of the absorbing medium into the gas-holder 1 when the rod 5, carrying the valve 3 and the body 4, is lifted through the stuffing-box $5^a$, whereupon the particular gas which it is desired to absorb from the gaseous mixture inclosed in the gas-holder 1 is absorbed by chemical combination with the absorbing medium $4^a$.

$1^a$ $1^b$ are flexible tubes attached at one end to tubular parts projecting from the gas-tight cover of the holder 1 and serving for the inlet and exit of the gaseous mixture. Said tubes connect with the gas-tubes $e^2$ $e^4$, each of which penetrates into a vessel E, containing a liquid seal for closing its end at suitable times. Flexible tube $1^b$ further connects with the vessel $i$ and through this with the air-tube $f'$, the former being charged with wadding to partially prevent the passage of gas into the latter and act as a resistance to the flow of gas and as a strainer. The air-tube $f'$, like the gas-tubes $e^2$ $e^4$, penetrates into a vessel F, also containing a liquid seal for closing its end at suitable times. This vessel communicates with the atmosphere, as shown. The gas-tube $e^2$ is surrounded by a gas-space $e'$ and gas-tube $e^4$ by a similar space $e^3$. The space $e'$ communicates through flexible tube E', filter W, and tube $E^a$ with the source of supply of gaseous mixture, as indicated by arrow I. The filter W is packed with wadding for cleansing the gaseous mixture from dust, soot, and the like. The space $e^3$ communicates with the atmosphere through flexible tube $E^2$, as indicated by arrow III. The opening and closing of the two gas-tubes $e^2$ $e^4$, as well as of the air-tube $f'$, takes place during the absorbing process. The three liquid-seal vessels E E F communicate by a common tube and also by a flexible tube D with a vessel B, supplied with the sealing liquid C—mercury, for instance. When this vessel is raised, the liquid C acts to close the gas-tubes $e^2$ $e^4$ and the air-tube $f'$, and when lowered to set free the open ends of said tubes. The end of the gas-tube $e^4$ lies somewhat higher than that of gas-tube $e^2$ and somewhat lower than that of tube $f'$, so that the tubes can be closed one after another, $e^2$ being first to be closed. The mercury and the vessels E and F act as valves to cut off or change the direction of the flow of gas through the apparatus. In order during the time the gas-tubes $e^2$ $e^4$ are shut off—that is, during the absorbing process—to be able to supply gas through flexible tube E', the gas-space $e'$ is further placed in communication with a liquid-seal vessel G through a flexible tube $E^3$, attached to a gas-tube which penetrates through the stopper of the liquid-seal vessel and into the liquid seal C'—paraffin-oil, for instance—as far down as $h$, so that with the gas-tubes $e^2$ $e^4$ closed the gas-pressure in $E^3$ overcomes the resistance of the liquid seal C' and the gas compressed in the bulb $g$ escapes through tube $E^4$; but with the gas-tubes $e^2$ $e^4$ open the liquid seal C' prevents the exit of gas through tube $E^4$. Consequently upon the charging of the gas-holder with a fresh gaseous mixture the exit of gas always takes place through tube $E^2$ and during the absorbing process through $E^4$.

$g$ is a measuring-receiver which forms part of the device for opening and shutting off the supply of gas. This receiver communicates by a tubular projecting part $g^a$ and flexible tube $f^2$ with the air-tube $f'$, and consequently also through vessel $i$ and flexible tube $1^b$ with the gas-holder 1. The same is furnished with a scale 10, having divisions indicating percentages of volume in proportion to the gas-space, and communicates through a tube 13 with a measuring vessel 11 and is charged with this latter vessel, up to zero-point, with a sealing or measuring liquid 12—paraffin-oil, for instance. Within the vessel 11 is a float 14, suspended, by means of a rod $14^a$, from one end of a lever 15, oscillating on pin $15^a$. The other end of said lever is connected to a rod $16^a$, carrying a marking-style 16. $16^a$ is a device for disengaging the marking-style.

20 is a support on which is fixed a clockwork 19, the drum 18 of which performs one revolution in twenty-four hours. Said drum is furnished with a paper recording-slip 17, having divisions proportionate to the scale 10. The whole apparatus is worked in a controlled manner from a lever A, mounted to turn on pin $a'$. A convenient method of moving this lever is to attach a rod $s$ to the end of the arm $a^4$ of the same and therefrom to work it up and down by mechanical means. In the arm $a^3$ of said lever is a curved slot $a^2$, in which is loosely carried a pin $6^b$, and on the end of this are fixed two parallel connecting-rods 6, the opposite ends of which are connected by a joint-pin $6^a$ to the valve-rod 5. Each connecting-rod 6 has attached to it on the outside a weight $6^c$ for the purpose when the lever A descends of causing the rod 5, valve 3, and absorbing-body 4 to descend of themselves. Between the two connecting-rods is a space which permits the free movement of the slotted part of the arm $a^3$ when the lever descends through the angle $a'$. To the lever A is jointed by a pin $b'$ the rod $b^2$, and to this latter the slide $b^4$, adapted to move in a guideway $b^3$, and having attached to it the vessel B, so that it follows the up and down movements of the lever A.

The apparatus works as follows: Shortly before the end of the stroke of the actuating-lever A through the angle $a'$ the liquid C in vessel B, raised by the rod $b^2$, has already shut off the open ends of the gas-tubes $e^2$ $e^4$ and of the air-tube $f'$, and thereby also the gaseous mixture in the gas-holder 1. Upon the further ascent of the lever A the lower end of the slot $a^2$ comes against the pin $6^b$ and through connecting-rod 6 draws the rod 5 upward through its stuffing-box $5^a$, thereby lifting the valve 3 and body 4 into the gas-holder 1. The process of absorbing the gas to be separated, and whose quantity is to be ascertained and recorded, from the gaseous mixture inclosed in the holder 1 now proceeds by reason of the absorbing medium carried by the body 4 coming into direct contact with the gaseous mixture, whereupon the gas to be separated enters into chemical combination with and is absorbed by the absorbing medium. The process of absorption is complete when the lever A has lifted the valve 3 up to the cover of the gas-holder 1. A rarefaction of the inclosed gaseous mixture is brought about at the same time and spreads through the tube $1^b$, vessel $i$, and tubes $f'$ $f^2$ to the measuring-receiver $g$, so that into the latter is drawn a liquid column which is in equilibrium with the rarefaction that has taken place in the holder 1. The liquid 12 correspondingly falls in the container 11, the float 14 also falling and the style 16 thereby raised, at the same time marking upon the paper strip 17 a vertical line proportionate in height to the liquid column drawn into the measuring-receiver $g$, and consequently also to the degree of rarefaction produced in the absorbing process. For instance, if previous to this process the gaseous mixture contained twelve per cent. in volume of a particular gas, which percentage is to be ascertained and recorded by means of the apparatus, the liquid column in the measuring-receiver $g$ will upon the completion of the absorption have risen to the twelfth division of the scale 10 and the marking-style to the twelfth line of the paper strip 17. The analysis is now finished and the result automatically recorded on the paper strip, which result can also be read off on the scale 10. In order to insure that for every gas analysis, therefore, for the absorbing process the gas-holder shall always contain gaseous mixture like that which at the particular time is present at the source of supply, gaseous mixture is likewise conducted to the apparatus through tube $E^a$ and then taking its way through filter W and flexible tube $E^3$ to the liquid-container G passes from the latter through the flexible tube $E^4$ in the direction of arrow II to the atmosphere, this occurring until the actuating-lever A has fallen back through the angle $a^2$ and the valve 3 by reason of the gravity of the weights $6^c$ has returned to its seat in the gas-holder, whereby the latter is again shut off from the absorbing medium $4^a$, and then the liquid seal $C^2$, having fallen, no longer keeps the gas-tubes $e^2$ $e^4$ and the air-tube $f'$ closed. Only upon the further fall of the lever A below the angle $a^2$ does the correspondingly-falling liquid seal C leave open, first, the higher-located air-tube $f'$, whereupon air passes from the space $f$ through said tube and tube $f^2$ into the measuring-receiver $g$, so that the inside of this receiver is in equilibrium with the atmosphere, in consequence of which the liquid 12 again comes to zero of the scale 10 and the float 14, then rising, again brings the marking-style 16 to zero of the paper strip. At the same time air also passes from the space $f$ through tube $f'$, vessel $i$, and tube $1^b$ into the gas-holder 1, so that this also is in equilibrium with the atmosphere. If now the lever A, and consequently also the liquid seal C, descends somewhat more, the open ends of the gas-tubes $e^2 e^4$ will be set free, and then, by reason of the resistance of the liquid seal C', which closes the end of tube $E^3$, the gases further passing to the apparatus through tube $E^a$ take their way no longer through the container G, but pass into the gas-space $e'$, thence through tubes $e^2$ and $1^a$ into the gas-holder 1, from the latter through tubes $1^b$ and $e^4$ into the gas-space $e^3$, and from this through tube $E^2$ in the direction indicated by arrow III to the atmosphere. The gas remaining behind in the gas-holder 1 after the previous gas analysis in the same is now driven out and a fresh gaseous mixture for another analysis charged therein until the open ends of the gas-tubes $e^2 e^4$ are again sealed up by the liquid C in the ascent of the lever A, a gaseous mixture which is under atmospheric pressure then being inclosed in the holder 1 as the gas-pressure in the latter is placed in equilibrium with the atmosphere through flexible tube $1^b$, vessel $i$, and air-tube $f'$, because this latter is shut off later than the gas-tubes $e^2 e^4$. The absorbing process and the indicating and recording operation performed in the described manner may be repeated as often as required.

The apparatus shown in Fig. 2 is substantially quite similar in its composition and working to that of Fig. 1, from which it differs only in that the gas-tubes $e^2 e^4$ and air-tube $f'$ are opened and shut off by means of valves instead of hydraulically. This is done in the same time intervals as in the apparatus of Fig. 1. In Fig. 2 the actuating-lever A is provided with an arm $a^5$, to which are jointed the rods 74 80. On the former is mounted a roller 75 and on the latter a roller 81. The rod 74 has jointed to it a rod 77, and the rod 80 a rod 83. The opposite end of rod 77 is jointed to the middle part of a bar 72, on the ends of which are respectively carried the stems 68 69 of valves 63 65, and the opposite end of rod 83 is jointed to a bar 73, and this latter to the stem 70 of the air-valve 67. Underneath the roller 75 is fixed a guide-bracket 76 and underneath the roller $81^a$ guide-bracket 82, so that upon the ascent of the lever A each roller will move up the inclined curve of its guide-bracket and close the valves 63 65 67 and, inversely, upon the descent of the lever A close these valves. The guide-brackets 76 82 are so formed and located that the air-valve 67 is only closed after the closure of the gas-valves 63 65 and opened before these latter and at the time intervals required in the absorbing process. A weight $a^6$ may be fixed on the lever A to balance it. The gas-conduits of Fig. 2 are similar to those of Fig. 1. The modified construction of Fig. 2 is more especially designed for apparatus that is exposed to shocks and vibrations or oscillations. According to the kind of absorbing liquid used in the apparatus the contents of different kinds of gas in a gaseous mixture can be ascertained and recorded—for example, the percentage volume of carbonic acid in furnace-gases or in the saturating-gases of sugar-factories when the absorbing liquid would be potash-lye, also the quantity of free oxygen or carbonic oxid therein if for the free oxygen pyrogallate and for the carbonic oxid cupric chlorid is used.

Having now particularly described and ascertained the nature of my said invention and in what manner the same is to be performed, I declare that what I claim is—

1. In an apparatus of the class described, the combination with a gas-chamber, of means for conducting gas into the same from a source of supply, a gas-cut-off device interposed between the source of supply and the gas-chamber and an indicating and a coöperating float-actuated recording device both operated by a variation of pressure caused by the action of the chemical on the gas in said chamber, substantially as described and shown.

2. In an apparatus of the class described, the combination with a gas-chamber, of a receptacle for a chemical forming part thereof, means for conducting gas into the chamber from a source of supply, a gas-cut-off device interposed between the source of supply and said chamber, an indicating and float-actuated recording device operated by variation in pressure caused by the action of a chemical on the gas in said chamber, substantially as described and shown.

3. In an apparatus of the class described, the combination with a gas-chamber, a receptacle for a chemical forming part thereof, of a valve interposed between the chamber and receptacle, means for conducting gas into the chamber from a source of supply, a valve interposed between the source of supply and said chamber and connected therewith, an indicating and float-actuated recording device both operated by variation of pressure in the chamber due to the action of the chemical on the gas, substantially as described and shown.

4. In an apparatus of the class described, the combination with the gas-absorption chamber, its interconnected cut-off and outlet valves; of a lever, a slotted portion thereon, a device for conveying chemical to the absorption-chamber and slidably connected to the slotted portion of said lever, a liquid-reservoir also connected to said lever and with all of said valves, whereby on moving said lever the valves will be successively sealed in the order named and then the device for conveying chemical moved, substantially as and for the purpose set forth.

5. In an apparatus of the class described, the combination with a gas-chamber, and a source of gas-supply, of a valve interposed between said chamber and supply, an indicating device, a valve-controlled gas-outlet from said chamber connected with said indicating device and a float-operated recording device, substantially as described and shown.

6. In an apparatus of the class described, the combination with a gas-chamber, of a source of gas-supply, a valve interposed between said supply and gas-chamber, a gas-outlet connected with two valves, means for successively closing said valves, a liquid-level-indicating device connected to one of said valves and a float-operated recording device operated by variation of liquid-level in the indicator, substantially as described and shown.

7. In an apparatus of the class described, the combination with a gas-chamber, of a source of gas-supply, a valve interposed therein, a gas-outlet from said chamber a valve interposed therein and a third valve connected with the gas-outlet, a liquid-level-operated indicator connected with the last-mentioned valve and through it with the gas-outlet, and a float-operated recording mechanism controlled by the level of the liquid in the indicator, substantially as described and shown.

8. In an apparatus of the class described, the combination with a gas-chamber, of devices for introducing a chemical therein, mechanism for operating the same, a gas-supply pipe, a cut-off valve therein, a liquid-sealed relief-valve between said valve and source of supply and means for closing said valve, operated by the chemical-introducing mechanism, substantially as described and shown.

9. In an apparatus of the class described, the combination with a gas-chamber, of a receptacle for chemicals below said chamber, a valve separating the two, devices for lifting chemical from the receptacle into the gas-chamber, a gas-supply pipe, a cut-off valve therein, an outlet-pipe from said chamber, a valve therein and third valve connected with the latter valve and the outlet-pipe, and means for successively closing all the valves, substantially as described and shown.

10. In an apparatus of the class described, a gas-chamber, of a receptacle below the same and forming part thereof, a valve separating the two, devices connected to said valve and organized to lift and expose in the chamber a large surface of chemical to the gas, a lifting-lever connected to said valve, a gas-supply pipe, a cut-off valve therein, an exit-pipe from said chamber a valve therein, and a third valve vented to the atmosphere, connected to the outlet-pipe, means for closing all the valves in the order named and a liquid-level-indicating device connected to the third valve, substantially as described and shown.

11. In an apparatus of the class described, the combination with a gas-chamber, a gas-supply pipe, a liquid-sealed relief-valve in said pipe and a cut-off valve in the supply-pipe between the relief-valve and gas-chamber sealed by a liquid of greater density than the liquid sealing the by-pass, substantially as described and shown.

12. In an apparatus of the class described, the combination with the gas-absorption chamber, of a U-tube connected at one leg therewith, a liquid in the bend of said tube, a lever organized to operate a stylus, a float in the other leg of said tube connected to said lever and a drum revoluble past said stylus, substantially as described and shown.

13. In an apparatus of the class described, the combination with the gas-absorption chamber, of a U-tube having one leg connected therewith, a valve between said tube and chamber organized to vent both to the atmosphere and a float in the other leg of said tube organized to operate a recording-stylus, substantially as described and shown.

14. In an apparatus of the class described, the combination with a gas-absorption chamber and a supply-pipe of a liquid-sealed cut-off valve in said pipe, an outlet-pipe, a liquid-sealed outlet-valve therein, a third valve interposed between the outlet-valve and chamber, a U-tube containing a liquid connected with said third valve, all of the valves organized to be closed in the order named and the last-mentioned valve organized to vent both chamber and tube to the atmosphere, substantially as described and shown.

15. In an apparatus of the class described, the combination with a gas-absorption chamber and a supply-pipe, of a liquid-sealed cut-off valve in said pipe, an outlet-pipe, a liquid-sealed outlet-valve therein, a third valve connected to the outlet-pipe, a strainer interposed between this valve and outlet-pipe, a U-tube connected at one leg to the third valve, a pipe for feeding sealing liquid common to all of the valves said valves organized to close in the order named, substantially as described and shown.

In testimony that I claim the foregoing as my invention I have signed my name in presence of two subscribing witnesses.

MAX ARNDT.

Witnesses:
ADOLF HARTMANN,
E. M. BRUNDAGE.